United States Patent Office 3,149,998
Patented Sept. 22, 1964

3,149,998
COLOR STABILIZED ARTICLES AND PROCESS
FOR PREPARING SAME
Roland Joseph Thurmaier, Waynesboro, Va., assignor to
E. I. du Pont de Nemours and Company, Wilmington,
Del., a corporation of Delaware
No Drawing. Filed Aug. 1, 1962, Ser. No. 213,909
19 Claims. (Cl. 117—138.8)

This invention relates to color-stabilized shaped articles and to a process for preparing such shaped articles from polyurethane compositions. More particularly, the invention relates to a process for preventing discoloration of spandex fibers upon exposure to oxides of nitrogen, chlorine, and other fumes.

It is known that spandex fibers on storage and upon exposure to atmospheric conditions are subject to acid fume discoloration which results in an undesirable yellowing of the fibers. While the discoloration may be offset to some extent by tinting or by the use of other masking agents, such materials often cause the fibers to display undesirable color charactistics since they merely mask and do not inhibit the formation of the yellow color.

It is, therefore, an object of the present invention to provide color-stabilized shaped articles of polyurethane compositions. It is a more particular object of this invention to provide spandex fibers which do not develop a yellow color upon exposure to oxides of nitrgen and other fumes. A further object of this invention is to provide a treating composition and process for treating spandex fibers which inhibit discoloration of the fibers upon exposure to fumes. Another object is to provide a process for removing or reducing the yellow discoloration resulting from exposure of unstabilized spandex fibers to such fumes.

These and other objects are accomplished by providing spandex fibers having a stabilizing quantity incorporated therein of a compound containing the radical $$—CX—NH—NH_2$$

wherein X is oxygen or sulfur and the free valence of said radical is satisfied by a group having no substituents reactive with said radicals. Such compounds include the hydrazides, dihydrazides, polyhydrazides, semi-carbazides, and their thioanalogs. The amount of stabilizer may vary within a fairly wide range with amounts from a fraction of 1%, e.g., 0.1%, to about 15% or more by weight being effective. The optimum quantity for a particular fiber will vary and for reasons of economy should, of course, be kept as low as possible. The selection of the optimum quantity will depend on a number of factors such as the particular type of spandex fiber, the fiber geometry, porosity, rheology, as well as the particle size of the stabilizer when applied from dispersions. Preferably, amounts from about 0.5% to about 5% by weight are utilized.

The term "spandex fiber" is used in its generic sense to mean a manufactured fiber in which at least 85% of the fiber-forming substance is a long-chain synthetic segmented polyurethane. It is not intended, however, that the invention be limited to fibers of such segmented polyurethanes since the stabilization is achieved with other shaped articles such as films and the like. The segmented polyurethanes which provide spandex fibers contain the recurring linkage —OCONH—. The preferred spandex fibers are those prepared from segmented polyurethanes in which the urethane nitrogen is joined to an aromatic radical, which is further attached to a ureylene linkage —NHCONH—. Such polyurethanes appear to be most susceptible to the degradative action of acid fumes. Generally speaking, the segmented polyurethanes are prepared from hydroxyl-terminated prepolymers such as hydroxyl-terminated polyethers and polyesters of low molecular weight. Reaction of the prepolymer with a molar excess of organic diisocyanate, preferably an aromatic diisocyanate, produces an isocyanate-terminated polymeric intermediate which may then be chain extended with a difunctional active hydrogen-containing compound such as water, hydrazine, organic diamines, glycols, amino alcohols, etc.

Among the segmented polyurethanes of the spandex type are those described in several patents among which are U.S. Patents 2,929,801, 2,929,802, 2,929,803, 2,929,-804, 2,953,839, 2,957,852, 2,962,470, 2,999,839, and 3,-009,901. As described in the aforementioned patents, the segmented polyurethane elastomers are comprised of amorphous segments derived from polymers having a melting point below about 50° C. and a molecular weight above about 600, and contain from about 5% to 40% of crystalline segments derived from a polymer having a melting point above about 200° C. in the fiber-forming molecular weight range. Most of such polyurethanes, when in filament form, have elongations greater than 150%, tensile recovery of over 90%, and a stress decay of less than 20%, as defined in U.S. 2,957,852. This invention is particularly effective when applied to the spandex fibers derived from hydrazine and described in U.S. 2,957,852, and this category of spandex is preferred in the practice of this invention.

Included among the stabilizers useful in the present invention are hydrazides having the formula $$R—CO—NH—NH_2$$

dihydrazides having the formula $$NH_2—NH—CO—R—CO—NH—NH_2$$

polyhydrazides having the formula $$R(—CO—NH—NH_2)_n$$

semicarbazides having the formula $$R—NH—CO—NH—NH_2$$

thiohydrazides having the formula $$R—CS—NH—NH_2$$

bisthiohydrazides having the formula $$NH_2—NH—CS—R—CS—NH—NH_2$$

polythiohydrazides having the formula $$R(—CS—NH—NH_2)_n$$

and thiosemicarbazides having the formula $$R—NH—CS—NH—NH_2$$

In these formulas, the monovalent R groups may be hydrogen (except in the hydrazides and thiohydrazides) or an organic monovalent group. When R is a di- or polyvalent radical, it is an organic radical having the requisite free valence bonds. The subscript $n$ is an integer greater than 2. The organic radicals may be aliphatic, cycloaliphatic, aromatic, or heterocyclic and preferably contain from 1 to about 18 carbon atoms, but the limitation of 18 carbon atoms is not considered to be critical for the purpose of this invention. Obviously, the R groups must be free of substituents which are reactive with the —CX—NH—NH_2 group, e.g., nitro, nitroso, and chloramine groups. The stabilizers in which X is oxygen are more effective than the corresponding compounds in which X is sulfur and are therefore preferred as a class.

Specific examples of the various classes of stabilizers useful in the practice of this invention are the hydrazides of acetic and propionic acids; the dihydrazides of adipic, diglycolic and carbonic acids (the latter compound also being known as carbohydrazide); the polyhydrazides obtained by the reaction of methacrylate and acrylate homopolymers and copolymers with hydrazine to yield a large molecule having a carbon backbone and pendant

—CO—NH—NH$_2$ groups; semicarbazide, butyl semi-carbazide, heptyl semicarbazide, octadecyl semicarbazide, asymmetrical diphenyl semicarbazide; thiocarbohydrazide; allyl thiosemicarbazide, heptyl thiosemicarbazide, and phenyl thiosemicarbazide. Other useful hydrazides and carbazides are disclosed in Clark, Charles C., "Hydrazine," Mathieson Chemical Corp., Baltimore, Md. (1953).

The stabilizer may be incorporated in the shaped article by various procedures. For example, it may be dissolved in a solution of the segmented polyurethane, and the solution may then be cast into a film in the conventional way. When the stabilizer is added to a solution of the segmented polyurethane, the polyurethane should be substantially free of unreacted isocyanate groups. Solutions of the spandex polymer containing the stabilizer may also be spun into fibers by the usual extrusion techniques, e.g., dry spinning. In such cases, if the spinning temperature is so high that the stabilizer volatilizes or undergoes degradation, larger amounts of the stabilizer, e.g., above 0.5% by weight, are added to the polymer solution before spinning.

Better results are obtained by methods similar to those used for incorporating dyestuffs. For example, the stabilizer may be dissolved in a suitable solvent to which the fibers are inert, i.e., non-reactive, and the fibers immersed in the treating solution. Or the stabilizer may be dispersed in a liquid medium and applied to the fiber by passing it through a treating bath containing the dispersed stabilizer. The temperature of the bath is not critical and will vary depending on the solvent or carrier utilized and the method of application used.

In a preferred embodiment, a treating bath is prepared which is comprised of an aqueous solution containing from about 1% to about 3% carbohydrazide. The spandex fibers, or a fabric containing such fibers, may be immersed in the bath, and the bath heated to a temperature of from 49° C. to 100° C. The fibers are held in the bath for a period of time sufficient to ensure that a stabilizing quantity of carbohydrazide is retained on removal from the bath. The time may vary from a few minutes to an hour or more. The bath solution may also be applied to the fabric using a padding technique.

The spandex fibers may be treated alone or may be incorporated in fabrics with fibers of different compositions. While the treatment of fabrics containing other fibers as well as spandex fibers requires more of the treating agent, the other fibers are not adversely affected. Both natural and synthetic fibers, as well as blends thereof, may be included in the fabrics without impairing the stabilization of the spandex fibers.

Another method for applying the stabilizer of this invention to spandex fibers is to incorporate the stabilizer in the spin finish applied to the fiber immediately after extrusion. The oil-based finishes described in U.S. Patent No. 3,039,895 are desirable finishes for spandex fibers and may be used in this manner. The stabilizers of this invention are easily dispersed in these finishes by a ball-milling operation.

This invention is also applicable to shaped articles other than fibers and films prepared, e.g. by molding, from segmented polyurethanes as hereinbefore defined. Additives, fillers, plasticizers and the like which are conventionally used with segmented polyurethanes may be used as desired with the stabilizers of this invention.

The principal advantage attained by the present invention resides in providing spandex fibers which are stabilized against yellowing due to nitric fumes. A further advantage is the stabilization against discoloration on exposure to chlorine. An important and surprising advantage is the fact that in some instances the discoloration resulting from the exposure of unstabilized spandex fibers to nitric fumes or chlorine may be substantially reduced by treating the yellowed fibers according to this invention.

In the following examples, which further illustrate this invention, the fume-fading tests are carried out according to AATCC Standard Test Method 23–1957, as described at pages 104–106 of The Technical Manual of the American Association of Textile Chemists and Colorists (1960).

The degree of yellowness, referred to in the examples as "$b$" value, is determined from colorimetric data obtained by analyzing continuous filament and fabric samples which are about three inches square. The reflectance ratios of the samples in the green and blue filter settings of a colorimeter are measured, using a Model IV Color Master Differential Colorimeter, manufactured by Manufacturing Engineering and Equipment Company, Hatboro, Pennsylvania, and calibrated against the manufacturer's standard reference plates and the National Bureau of Standard's certified reflectance plates. Three readings are taken on each of the samples, one of the measurements for the filament sample being made with the sample rotated 90° from the position of the first reading. The "$b$" values are then calculated from the average of three readings, using the following formula $$b = 42.34 G^{1/2} B^{1/2}$$

where G represents the reflectance ratio with the green filter and B represents the reflectance ratio with the blue filter.

When the stabilizers of this invention are used with a solution of segmented polyurethane, an alternative method of incorporating the stabilizer is to add precursors which react in the solution to form the stabilizer in situ. Thus, by the addition of equimolar quantities of ethyl isocyanate and hydrazine to a solution of segmented polyurethane there is formed ethyl semicarbazide in the solution.

In the following examples, parts and percentages are by weight, unless otherwise indicated.

*Example 1*

Into a mixer maintained at 50° C. are fed a stream of polytetramethylene ether glycol at a rate of 8 pounds per hour and a stream of liquid p,p'-methylenediphenyl diisocyanate at 2 pounds per hour. The polytetramethylene ether glycol has a molecular weight of about 2000 and is thoroughly pre-dried by treatment with a molecular sieve. The reagents are intimately mixed, remain in the mixer for one minute, and are discharged continuously into a jacketed pipeline maintained at about 96° C. and extending for 25 feet. The pipeline serves as a reactor in which the polyether glycol is "capped" with 2 mols of the diisocyanate to yield an isocyanate-terminated polyether. The average time spent in the reactor is between 90 and 100 minutes. On emerging from the pipeline reactor, the isocyanate-terminated polyether is cooled at once to below 45° C. The cooled isocyanate-terminated polyether is conducted at a rate of 9.2 pounds per hour into a high-shear mixer containing a rotating disc, and a stream of N,N-dimethylacetamide is added at 6.8 pounds per hour. The mixture (57.5% solids) is thoroughly agitated for 15 minutes and then passes to a chamberber in which a mixture of hydrazine (35% in water) and diethylamine (5% in dimethylacetamide), in the ratio of 4.2 parts of hydrazine to 1 part of diethylamine, together with additional dimethylacetamide is added as a single stream at a rate of 16.5 pounds per hour with strong agitation. The mixture passes to a reaction chamber held at a temperature of 20° to 70° C., the contents having a residence time of about 2–3 minutes. The emerging polymer solution contains approximately 30.0% solids and has a viscosity of 1400 poises at 30° C. The polymer has an intrinsic viscosity of 1.2. To the polymer solution are added a slurry of titanium dioxide in dimethylacetamide and a solution of poly-(N,N-diethyl-beta-aminoethyl methacrylate) in dimethylacetamide such that the final mixture contains 5% of each additive, based on the elastomeric solids.

To a portion of the foregoing mixture was added butyl semicarbazide such that the mixture contained 0.77% of this additive based on the polymeric solids. Films were cast from solutions which contained and were free of the butyl semicarbazide. After thorough drying, the films were measured for "b" value, according to the procedure described above. The two films were then subjected for 16 hours to the fume discoloration test described earlier. After this exposure they were allowed to cool and were again measured for "b" value. Results were as follows:

|  | "b" Values | |
|---|---|---|
|  | As prepared | After fume exposure |
| Sample with butyl semicarbazide | −1.0 | −1.0 |
| Control | 1.1 | 7.0 |

*Example II*

Films were prepared and tested as described in Example I except that 0.77% of allyl thiosemicarbazide was used instead of butyl semicarbazide. Results were as follows:

|  | "b" Values | |
|---|---|---|
|  | As prepared | After fume exposure |
| Sample with allyl thiosemicarbazide | 0.7 | 3.0 |
| Control | 1.2 | 8.1 |

*Example III*

Films were prepared and tested as described in Example I except that 0.63% of thiocarbohydrazide was used instead of butyl semicarbazide. Results were as follows:

|  | "b" Values | |
|---|---|---|
|  | As prepared | After fume exposure |
| Sample with thiocarbohydrazide | 2.2 | 4.2 |
| Control | 2.0 | 7.0 |

*Example IV*

To a portion of the solution of segmented polyurethane described in the first paragraph of Example I above there was added thiosemicarbazide such that the mixture contained 0.54% of this additive based on the polymeric solids. The mixture was heated to a temperature of 70° C. and dry spun in the conventional manner to yield a 280-denier coalesced multifilament strand. To this strand was applied an oil-based finish as described in U.S. Patent No. 3,039,895. This product and a similar sample containing no thiosemicarbazide were wound separately on metal plates in such a manner that the strands completely covered the plates in the area of color measurement. The samples were measured for "b" value and subjected to the fume discoloration test for 16 hours. The data obtained were as follows:

|  | "b" Values | |
|---|---|---|
|  | As prepared | After fume exposure |
| Sample with thiosemicarbazide | 1.0 | 6.7 |
| Control | −0.4 | 10.2 |

*Example V*

Coalesced multifilament spandex was prepared and tested as in Example IV except that in place of the thiosemicarbazide there was added 5.9 millimoles of butyl isocyanate and 42 millimoles of 95% hydrazine per 100 grams of polymeric solids. This procedure resulted in the in situ formation of butyl semicarbazide (0.77%). Results were as follows:

|  | "b" Values | |
|---|---|---|
|  | As prepared | After fume exposure |
| Sample with butyl semicarbazide | −0.6 | 5.4 |
| Control | −0.3 | 14.1 |

*Example VI*

Coalesced multifilament spandex was prepared as in Example IV except that 2.2% of carbohydrazide based on polymeric solids was used instead of thiosemicarbazide. The carbohydrazide was added as an ingredient in the slurry of titanium dioxide and poly(N,N-diethyl-beta-amino-ethyl methacrylate) which was prepared according to the procedure described in the copending application of Ruehl, Serial No. 37,837, filed June 22, 1960. Samples both with and without carbohydrazide were exposed for 16 hours to the fume discoloration test previously described. Other samples were exposed for 6 days to the ambient atmosphere. Results were as follows:

|  | "b" Values | | |
|---|---|---|---|
|  | As prepared | 16 hours fume exposure | 6 days atmospheric exposure |
| Sample with carbohydrazide | 1.3 | 12.6 | 2.7 |
| Control | 1.7 | 18.5 | 6.8 |

*Example VII*

Coalesced multifilament spandex was prepared and tested as in Example VI except that octadecyl semicarbazide (1.9% based on polymeric solids) was used instead of carbohydrazide. Results were as follows:

|  | "b" Values | | |
|---|---|---|---|
|  | As prepared | 16 hours fume exposure | 11 days atmospheric exposure |
| Sample with octadecyl semicarbazide | 0.7 | 14.1 | 3.3 |
| Control | 0.0 | 16.2 | 5.2 |

*Example VIII*

Coalesced multifilament spandex was prepared and tested as described in Example VI except that phenyl semicarbazide (2.3% based on polymeric solids) was added to the polymer solution before spinning. Results were as follows:

|  | "b" Values | | |
|---|---|---|---|
|  | As prepared | 16 hours fume exposure | 8 days atmospheric exposure |
| Sample with phenyl semicarbazide | 0.5 | 10.5 | 4.3 |
| Control | 0.4 | 15.0 | 5.6 |

Example IX

Coalesced multifilament spandex was prepared as described in Example VI except that the spinning solution contained no carbohydrazide. Instead, the carbohydrazide was dispersed by ball milling in an oil-based finish which was applied to the yarn after spinning. The finish consisted of 90% No. 50 mineral oil, 3% polyoxyethylene stearate, 2% magnesium stearate, and 5% carbohydrazide. The resulting fiber contained about 9.51% of finish by weight and contained 0.7% carbohydrazide. Results after testing as in Example VI were as follows:

|  | "b" Values | | |
|---|---|---|---|
|  | As prepared | 16 hours fume exposure | 34 days atmospheric exposure |
| Sample with carbohydrazide | 0.0 | 1.6 | 1.3 |
| Control | 0.4 | 20.2 | 10.3 |

Example X

Coalesced multifilament spandex was prepared as in Example IX except that the oil-based finish contained 10% by weight of octadecyl semicarbazide. The fibers contained about 11% of finish and about 1.1% of octadecyl semicarbazide. Results were as follows:

|  | "b" Values | |
|---|---|---|
|  | As prepared | 16 hrs. fume exposure |
| Sample with octadecyl semicarbazide | −1.8 | 0.5 |
| Control | −1.4 | 13.8 |

Example XI

A skein of coalesced multifilament spandex, prepared as described in Example VI except that the spinning solution contained no carbohydrazide, was dipped for one minute in a 0.5% aqueous solution of carbohydrazide. A 0.5% pick-up of stabilizer was indicated by the difference in weight of the dried skein before and after dipping. After the skein was dried in air, the color was measured in terms of "b" value. The skein was then subjected to the 16-hour fume discoloration test, cooled to room temperature, and again measured for "b" value. Results were as follows:

| Percent carbohydrazide on yarn | "b" Values | |
|---|---|---|
|  | As prepared | After fume exposure |
| 0.5 | 2.1 | 3.7 |
| 0 | 2.5 | 11.7 |

Example XII

A skein of coalesced multifilament prepared as in Example XI was dipped in a 5% aqueous solution of acetic hydrazide for one minute, dried in air, and tested as before. Results were as follows:

| Percent acetic hydrazide on yarn | "b" Values | |
|---|---|---|
|  | As prepared | After fume exposure |
| 1.5 | 0.4 | 8.8 |
| 0 | 0.4 | 13.6 |

Example XIII

A skein of coalesced multifilament prepared as in Example XI was dipped in a 5% aqueous solution of diglycolic dihydrazide for one minute and dried in air. Results were as follows:

| Percent diglycolic dihydrazide on yarn | "b" Values | |
|---|---|---|
|  | As prepared | After fume exposure |
| 1.5 | 0.7 | 14.4 |
| 0 | 0.6 | 18.3 |

Example XIV

A skein of the polyester-based spandex fiber described in U.S. Patent 2,953,839 is dipped for one minute in a 0.5% aqueous solution of carbohydrazide. After air drying, the skein is exposed to the fume discoloration test previously described with the following results:

| Percent carbohydrazide on yarn | "b" Values | |
|---|---|---|
|  | As prepared | After fume exposure |
| 0.5 | 4.0 | 4.7 |
| 0 | 4.3 | 7.1 |

Example XV

A coalesced multifilament was prepared as in Example VI except that metaphenylene diamine is used as chain-extending agent instead of the hydrazine of that example. A skein of this spandex product is dipped for one minute in a 0.5% aqueous solution of carbohydrazide. Results were as follows:

| Percent carbohydrazide on yarn | "b" Values | |
|---|---|---|
|  | As prepared | After fume exposure |
| 0.5 | 4.0 | 5.4 |
| 0 | 3.7 | 9.6 |

Example XVI

A coalesced multifilament spandex fiber, prepared as in Example VI except that the spinning solution contained no carbohydrazide, was used in the fabrication of a power net fabric. The fabric was composed of 30% of the spandex fiber and 70% nylon filament yarn and was treated as follows in a Farmer-Norten jig. A solution of carbohydrazide in water containing about 5% carbohydrazide based on the weight of the power net fabric was prepared and diluted such that the ratio of solution weight/fabric weight was 40/1. The solution temperature was raised to 82° C., and the fabric was passed through the solution four times. The fabric was then removed, dried at 93° C. and found to have picked up 1.5% by weight of carbohydrazide. The fabric was then exposed to the fume discoloration test described previously with the following results:

|  | "b" Values | |
|---|---|---|
|  | As prepared | After fume exposure |
| Sample with carbohydrazide | 2.87 | 3.66 |
| Control | 1.42 | 9.72 |

Example XVII

Another sample of the spandex/nylon fabric of Example XVI was passed through a 3% solution of carbohydrazide in water at a temperature of 66° C. in the finish tank of a conventional padding apparatus. The fabric was squeezed by rolls such that a solution pick-up of 50% of the fabric weight was obtained. After drying at 93° C., the fabric contained 1.5% carbohydrazide and was tested for fume discoloration with the following results:

|  | "b" Values | |
| --- | --- | --- |
|  | As prepared | After fume exposure |
| Sample with carbohydrazide | 2.25 | 1.09 |
| Control | 2.30 | 2.13 |

*Example XVIII*

Another sample of the fabric described in Example XVI containing no carbohydrazide was subjected to the fume discoloration test for eight hours. The fabric was then scoured for 15 minutes at the boil in an aqueous solution containing 5% of carbohydrazide based on fabric weight. The fabric was then dried at 38° C. for thirty minutes, and the "b" value was again measured. Results were as follows:

```
                                           "b" values
As prepared _____   1.03
After fume discoloration treatment _____   6.68
After scouring _____   2.47
```

As many widely different embodiments of this invention may be made without departing from the spirit and scope thereof, it is to be understood that this invention is not to be limited to the specific embodiments thereof except as defined in the appended claims.

I claim:

1. A spandex fiber stabilized against acid fume discoloration by having incorporated therein a stabilizing quantity of a compound selected from the class consisting of hydrazides and carbazides containing the radical

—CX—NH—NH$_2$ wherein X is selected from the class consisting of oxygen and sulfur and the free valence of said radical is satisfied by a group having no substituents reactive with said radical.

2. The fiber of claim 1 wherein said compound is present in an amount up to about 15% by weight of said fiber.

3. An acid fume stabilized spandex fiber containing from about 0.5% to about 5% by weight of a compound selected from the class consisting of hydrazides and carbazides containing the radical —CO—NH—NH$_2$ wherein the free valence of said radical is satisfied by a group having no substituents reactive with said radical.

4. A shaped article of a long chain synthetic elastomer comprised of at least 85% of a segmented polyurethane stabilized against acid fume discoloration by the presence therein of a stabilizing quantity of a compound selected from the class consisting of hydrazides and carbazides containing the radical —CX—NH—NH$_2$ wherein X is selected from the class consisting of oxygen and sulfur and the free valence of said radical is satisfied by a group having no substituents reactive with said radical.

5. The shaped article of claim 4 wherein said compound is present in an amount from about 0.1% to about 15% by weight of said shaped article.

6. The shaped article of claim 5 wherein said polyurethane is prepared by chain extending an isocyanate-terminated polymeric intermediate with hydrazine.

7. The shaped article of claim 6 wherein said compound is present in an amount from about 0.5% to about 5% by weight of said shaped article.

8. A shaped article prepared from a long chain fiber-forming synthetic polyurethane stabilized against acid fume discoloration by having incorporated therein a stabilizing quantity of a compound selected from the class consisting of hydrazides and carbazides containing the radical —CX—NH—NH$_2$ wherein X is selected from the class consisting of oxygen and sulfur and the free valence of said radical is satisfied by a group having no substituents reactive with said radical.

9. The shaped article of claim 8 wherein said compound is present in an amount up to about 15% by weight of said shaped article.

10. The shaped article of claim 9 wherein said compound is carbohydrazide.

11. The shaped article of claim 9 wherein said compound is butyl semicarbazide.

12. The shaped article of claim 9 wherein said compound is phenyl semicarbazide.

13. The process for acid fume stabilizing spandex fibers which comprises applying thereto a treating composition containing a compound selected from the class consisting of hydrazides and carbazides containing the radical —CX—NH—NH$_2$ wherein X is selected from the class consisting of oxygen and sulfur and the free valence of said radical is satisfied by a group having no substituents reactive with said radical.

14. The process of claim 13 wherein said treating composition is applied to said fibers by immersing said fibers in a treating bath containing said compound for a period of time sufficient to provide from about 0.1% to about 15% by weight of said compound on said fibers.

15. The process of claim 14 wherein said compound is carbohydrazide.

16. The process of claim 14 wherein said compound is butyl semicarbazide.

17. The process of claim 14 wherein said compound is phenyl semicarbazide.

18. The process of acid fume stabilizing a shaped article of a long chain synthetic elastomer comprised of at least 85% of a segmented polyurethane which comprises dipping said shaped article into a treating composition containing a compound selected from the class consisting of hydrazides and carbazides containing the radical —CX—NH—NH$_2$ wherein X is selected from the class consisting of oxygen and sulfur and the free valence of said radical is satisfied by a group having no substituents reactive with said radical for a period of time sufficient to provide a stabilizing quantity of said compound on said article and thereafter drying said article.

19. The process of acid fume stabilizing a polyurethane shaped article which comprises mixing into an organic solvent solution of a fiber-forming long chain synthetic segmented polyurethane a stabilizing amount of a compound selected from the class consisting of hydrazides and carbazides containing the radical

—CX—NH—NH$_2$ wherein X is selected from the class consisting of oxygen and sulfur and the free valence of said radical is satisfied by a group having no substituents reactive with said radical and thereafter extruding said solution through an orifice to form said shaped article.

References Cited in the file of this patent
UNITED STATES PATENTS
3,095,322  Sadowski et al. _____ June 25, 1963

UNITED STATES PATENT OFFICE
CERTIFICATE OF CORRECTION

Patent No. 3,149,998      Dated October 13, 1969

Inventor(s) Roland Joseph Thurmaier

It is certified that error appears in the above-identified patent and that said Letters Patent are hereby corrected as shown below:

Column 4, lines 15 and 16, "Manufacturing Engineering and Equipment Company" should read -- Manufacturers Engineering and Equipment Corporation --; line 25, "$b=42.34G^{1/3}B^{1/3}$" should read -- $b=42.34(G^{1/3}-B^{1/3})$ -- .

SIGNED AND SEALED

JUN 9 1970

(SEAL)
Attest:

Edward M. Fletcher, Jr.
Attesting Officer

WILLIAM E. SCHUYLER, JR.
Commissioner of Patents